United States Patent
Lee et al.

(10) Patent No.: US 10,017,126 B2
(45) Date of Patent: Jul. 10, 2018

(54) ACTUATOR BASED EXTENDABLE SMARTPHONE HOLDING DEVICE OF VEHICLE

(71) Applicants: Hyundai Motor Company, Seoul (KR); Kia Motors Corporation, Seoul (KR); Hyundai Mobis Co., Ltd., Seoul (KR)

(72) Inventors: Young Ju Lee, Gyeonggi-do (KR); Dae Ig Jung, Gyeonggi-do (KR); Hye Kyung Kim, Gyeonggi-do (KR); Keon Soo Jin, Ulsan (KR); Jae Seob Choi, Gyeonggi-do (KR); Min Geun Oh, Gyeonggi-do (KR); Won Sik Kim, Gyeonggi-do (KR)

(73) Assignees: Hyundai Motor Company, Seoul (KR); Kia Motors Corporation, Seoul (KR); Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 15/215,058

(22) Filed: Jul. 20, 2016

(65) Prior Publication Data

US 2017/0166140 A1    Jun. 15, 2017

(30) Foreign Application Priority Data

Dec. 14, 2015  (KR) .......................... 10-2015-0178262

(51) Int. Cl.
*B60R 11/02*   (2006.01)
*H04M 1/11*    (2006.01)
(Continued)

(52) U.S. Cl.
CPC ........... *B60R 11/0241* (2013.01); *H04M 1/04* (2013.01); *H04M 1/11* (2013.01);
(Continued)

(58) Field of Classification Search
CPC ..... B60R 2011/0005; B60R 2011/0075; B60R 7/06; B60R 2011/0082; B60R 11/0241
See application file for complete search history.

(56) References Cited

U.S. PATENT DOCUMENTS 5,940,502 A * 8/1999 Hirai .................... B60R 11/0241
                                                379/446
5,996,866 A * 12/1999 Susko ................. B60R 11/0241
                                                224/281
(Continued)

FOREIGN PATENT DOCUMENTS

DE           19539784 A1 *  4/1997 ......... B60R 11/0241
DE       102011109056 A1 *  1/2013 ............ B60R 11/02
(Continued)

OTHER PUBLICATIONS

Machine Translation of DE 102014222916 A1, Weidig Marcus, May 2016.*

(Continued)

*Primary Examiner* — Devan Sandiford
(74) *Attorney, Agent, or Firm* — Mintz Levin Cohn Ferris Glovsky and Popeo, P.C.; Peter F. Corless (57) ABSTRACT

A smartphone holding device of a vehicle includes: a holder configured to hold a smartphone; a main body configured to receive the holder such that the holder is extendable from the main body; an actuator configured to generate a drive force causing vertical movement of the holder; and a vertical feeding member installed between the actuator and the holder and configured to vertically move the holder by the drive force from the actuator.

9 Claims, 11 Drawing Sheets

(51) Int. Cl.
*H04M 1/04* (2006.01)
*B60R 11/00* (2006.01)

(52) U.S. Cl.
CPC ............... *B60R 2011/0003* (2013.01); *B60R 2011/0043* (2013.01); *B60R 2011/0082* (2013.01); *B60R 2011/0084* (2013.01); *B60R 2011/0092* (2013.01)

(56) References Cited

U.S. PATENT DOCUMENTS

| | | | | |
|---|---|---|---|---|
| 6,929,304 | B1* | 8/2005 | Dry | A47C 7/72 224/539 |
| 7,162,281 | B2* | 1/2007 | Kim | A45F 5/02 224/196 |
| 8,200,293 | B2* | 6/2012 | Park | B60R 11/0241 455/569.2 |
| 8,910,990 | B1* | 12/2014 | Oldani | B60R 11/02 220/260 |
| 2004/0242285 | A1 | 12/2004 | Farshi | |
| 2011/0053660 | A1* | 3/2011 | Park | B60R 11/0241 455/575.1 |
| 2011/0156478 | A1* | 6/2011 | Thorsell | B60K 37/04 307/9.1 |
| 2012/0104195 | A1* | 5/2012 | Da Costa Pito | B60R 11/0241 248/205.1 |
| 2012/0312847 | A1* | 12/2012 | LaColla | B60R 11/02 224/275 |
| 2013/0174660 | A1* | 7/2013 | Imasaka | B60R 11/02 73/493 |
| 2013/0176669 | A1* | 7/2013 | Takahashi | B60R 11/02 361/679.01 |
| 2014/0091192 | A1* | 4/2014 | Mersky | F16M 11/041 248/447 |
| 2014/0265185 | A1* | 9/2014 | Mersky | B62B 3/1428 280/33.992 |
| 2014/0339847 | A1* | 11/2014 | Brunard | B60R 11/02 296/37.12 |
| 2014/0361569 | A1* | 12/2014 | Crepaldi | B60R 11/0235 296/37.12 |
| 2015/0258943 | A1* | 9/2015 | Harding | B60R 11/02 296/37.12 |
| 2015/0350397 | A1* | 12/2015 | Vourlat | B60R 11/0235 455/575.9 |
| 2016/0193968 | A1* | 7/2016 | Oldani | B60R 11/02 296/37.12 |
| 2017/0136963 | A1* | 5/2017 | Carson | B60R 11/04 |

FOREIGN PATENT DOCUMENTS

| | | | | |
|---|---|---|---|---|
| DE | 102014222916 | A1 * | 5/2016 | ............. B60R 11/02 |
| FR | 2965768 | A1 * | 4/2012 | ............. B60R 11/02 |
| KR | 2002-0019798 | A | 3/2002 | |
| KR | 2004-0039620 | A | 5/2004 | |
| KR | 10-2011-0024258 | A | 3/2011 | |
| KR | 10-2012-0029113 | A | 3/2012 | |
| KR | 2012-0067022 | A | 6/2012 | |
| KR | 2015-0075785 | A | 7/2015 | |

OTHER PUBLICATIONS

Machine Translation of DE 19539784 A1, Dabringhaus Voker, Apr. 1997.*

* cited by examiner

ACTUATOR BASED EXTENDABLE SMARTPHONE HOLDING DEVICE OF VEHICLE

CROSS-REFERENCE TO RELATED APPLICATION

This application claims under 35 U.S.C. § 119(a) the benefit of and priority to Korean Patent Application No. 10-2015-0178262 filed on Dec. 14, 2015, the entire contents of which are incorporated herein by reference.

BACKGROUND (a) Technical Field

The present disclosure relates generally to a smartphone holding device of a vehicle, and more particularly, to a smartphone holding device of a vehicle capable automatically extending from or retracting into a crash pad in accordance with a user's desire.

(b) Background Art

Recently, use of smartphones has greatly increased. In connection with this, various applications have been developed to enable smartphones to be used for a wide range of purposes. For example, a navigation application can be installed in a smartphone to enable the smartphone to be used as a navigation device. In this case, the smartphone can be fixed to a top surface of a crash pad installed inside a vehicle to enable the driver to conveniently see the smartphone while the vehicle is being driven.

Conventionally, a holder is used to securely fix the smartphone inside the vehicle. A holder which is manually detachably attached to the top surface of the crash pad is widely used. However, when the holder is attached to the top surface of the crash pad, it is typically fixed in that position until it is detached by the user.

SUMMARY OF THE DISCLOSURE

The present disclosure has been made in an effort to solve the above-described problems associated with the related art.

The present disclosure relates to a smartphone holding device of a vehicle, which includes a holder for holding a smartphone, the holder being extendable from inside of a crash pad in a motor-driven manner, thereby being capable of automatically extending from or retracting into the crash pad in accordance with a user's desire.

According to embodiments of the present disclosure, a smartphone holding device of a vehicle includes: a holder configured to hold a smartphone; a main body configured to receive the holder such that the holder is extendable from the main body; an actuator configured to generate a drive force causing vertical movement of the holder; and a vertical feeding member installed between the actuator and the holder and configured to vertically move the holder by the drive force from the actuator.

The holder may include an upper grip member, and a lower support member separably connected to the upper grip member, and the vertical feeding member may be interposed between the upper grip member and the lower support member. A tension spring may be installed between the upper grip member and the vertical feeding member, to apply a tensile force to the upper grip member.

An extension support member may be formed at a central portion of a lower surface of the lower support member, to protrude downwards from the lower surface of the lower support member. A back engagement portion may be formed at a back surface of the extension support member, to protrude backwards from the back surface of the extension support member. A lower engagement portion having a protrusion shape may be formed at a front surface of the vertical feeding member, to be vertically movable between the lower surface of the lower support member and the back engagement portion of the extension support member. An upper engagement portion having a protrusion shape may be formed at a back surface of the vertical feeding member, to be vertically movably inserted into an opening formed at a lower end of the upper grip member.

A pair of holder support members, which are elastically supported to be laterally widened from each other by the torsion springs, may be installed at a lower portion of the main body. Guide ribs may be formed at lateral edges of the vertical feeding member, respectively, to protrude forwards. The pair of holder support members may be pivoted by the guide ribs during upward movement of the vertical feeding member, to converge toward a center therebetween, thereby supporting a lower surface of the lower support member.

The smartphone holding device may further include a controller controlling operation of the actuator, based on an operation signal generated when a user operates an operating button, and a mechanical detection switch installed at the holder, to detect whether or not a smartphone has been held in the holder.

The controller may determine whether or not the smartphone is held in the holder, based on a signal received from the detection switch, upon receiving the signal from the operating button in a state in which the holder has been retracted into the main body. The controller may operate the actuator upon determining that the smartphone is held in the holder, so as to move the vertical feeding member downwards until the upper engagement portion is engaged with a lower end of the opening of the upper grip member, to prevent upward movement of the upper grip member.

Upon determining that the smartphone is not held in the holder, and the operation signal is not received from the operating button within a predetermined time after the determination, the controller may operate the actuator, so as to cause the holder to be retracted into the main body.

Upon receiving the operation signal from the operating button when the is held in the holder, the controller may operate the actuator so as to release prevention of upward movement of the upper grip member such that the vertical feeding member moves upwards and may then determine whether or not the smartphone has been separated from the holder, based on the signal received from the detection switch. Upon determining that the smartphone has been separated from the holder, and the operation signal has not been received from the operating button within a predetermined time after the determination, the controller may operate the actuator, so as to cause the holder to be retracted into the main body.

Slide rails may be installed at lateral sides of the main body, respectively, to guide vertical movement of the vertical feeding member.

The main body may be fixedly installed inside of a crash pad arranged in the vehicle, and a top surface of the holder retracted into an inner space of the main body may be flush with a surface of the crash pad without forming a step.

Other aspects and embodiments of the disclosure are discussed infra.

BRIEF DESCRIPTION OF THE DRAWINGS

The above and other features of the present disclosure will now be described in detail with reference to certain embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with embodiments, it will be understood that present description is not intended to limit the disclosure to those embodiments. On the contrary, the disclosure is intended to cover not only the embodiments described herein, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Figure 1:
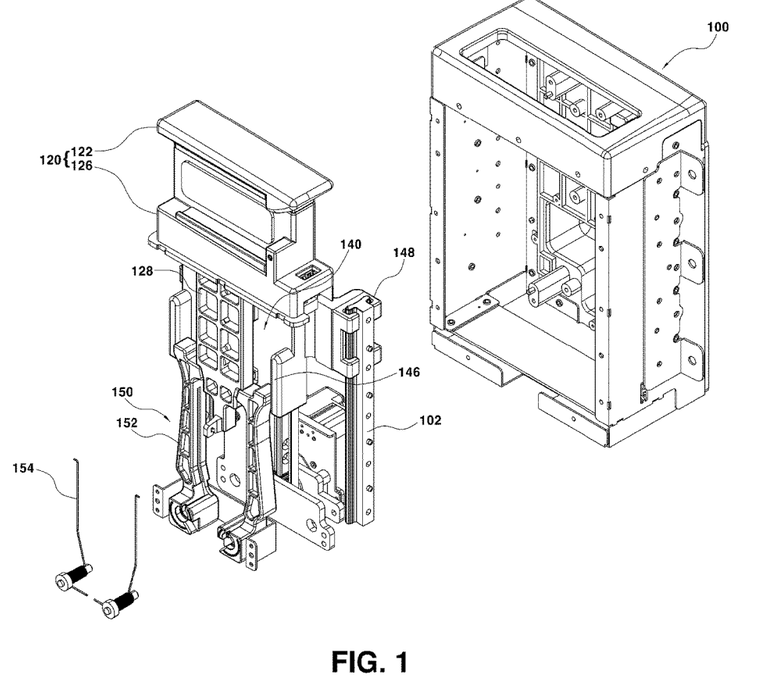
FIG. 1 is a front perspective view illustrating a smartphone holding device of a vehicle according to embodiments of the present disclosure.
Figure 2:
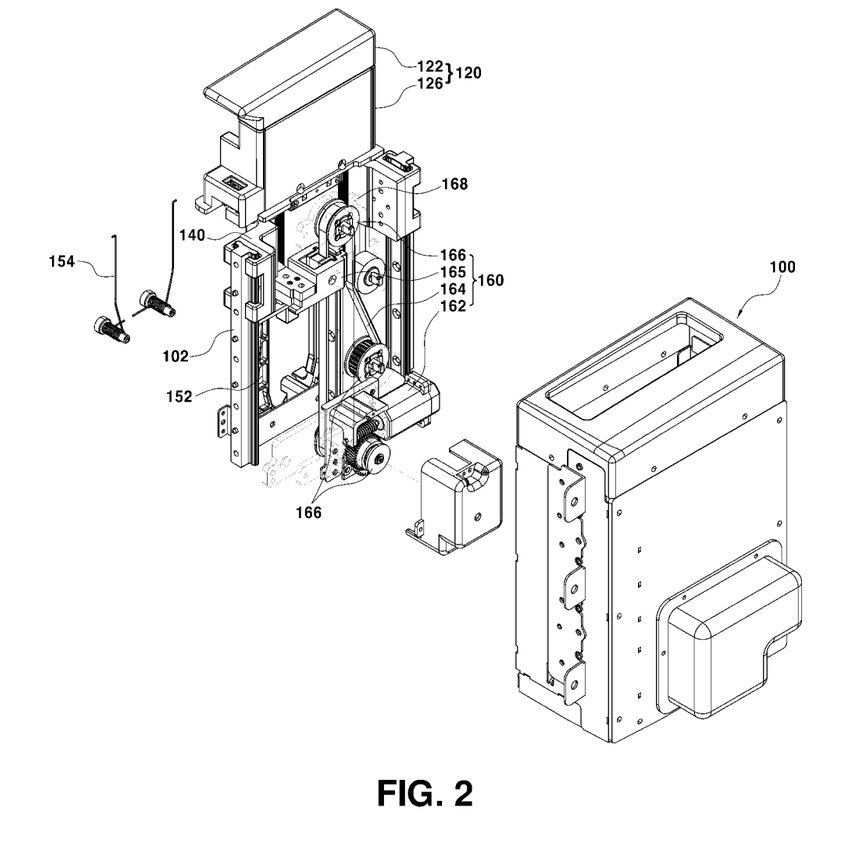
FIG. 2 is a rear perspective view illustrating the smartphone holding device according to embodiments of the present disclosure.
Figure 3:
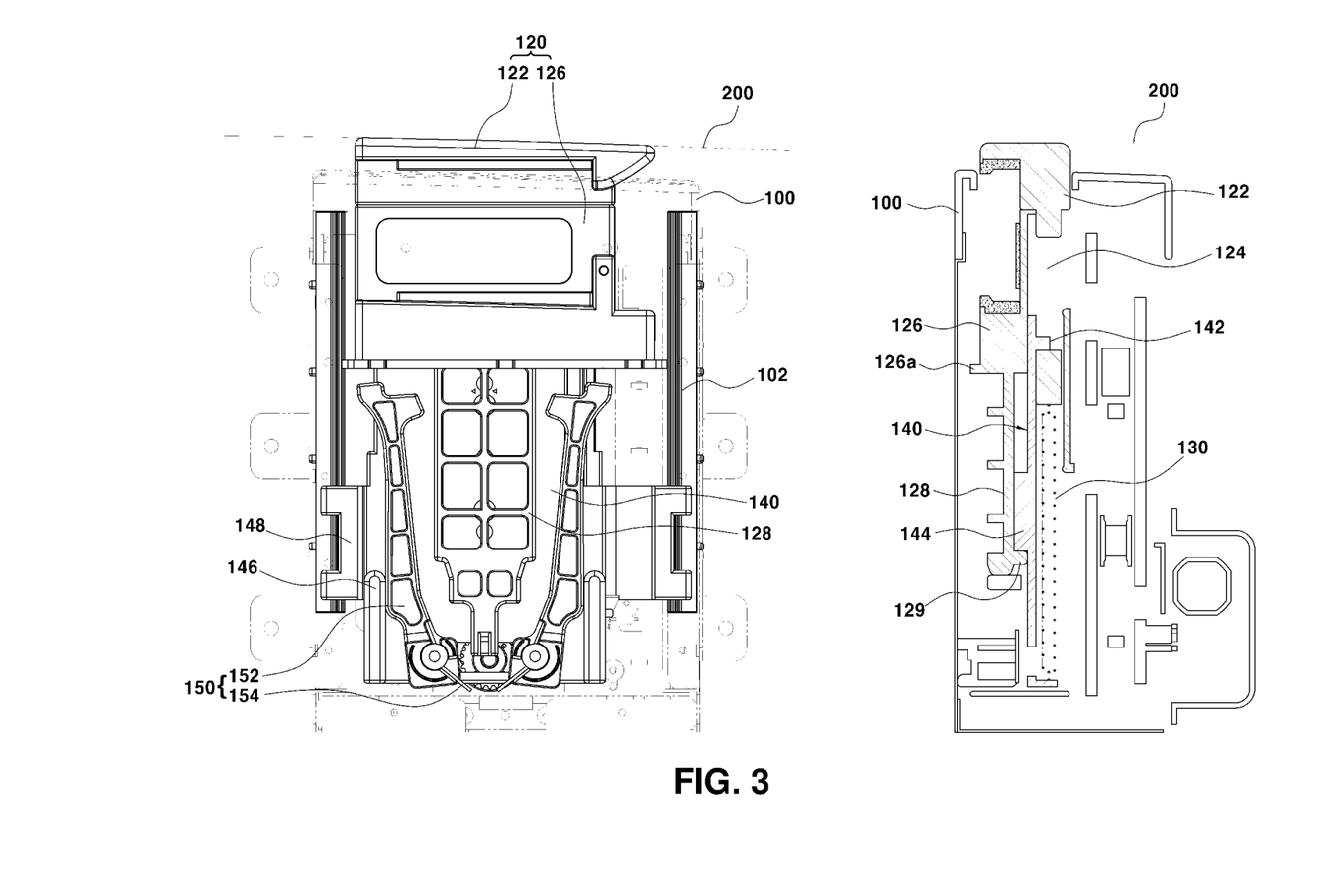
FIG. 3 illustrates a holder-retracted state of the smartphone holding device according to embodiments of the present disclosure, through a front view and a sectional view.

Referring now to FIGS. 1 to 3, a smartphone holding device according to embodiments of the present disclosure is illustrated. The smartphone holding device includes a holder 120 having a structure capable of holding a smartphone, a main body 100 for receiving the holder 120 such that the holder 120 is extendable from the main body 100, and an actuator 160 for generating drive force for vertical movement (or linear reciprocation) of the holder 120. The smartphone holding device is installed at a front side in a vehicle, and is operated in a motor-driven manner, to cause the holder 120 to extend from the main body 100 or to retract into the main body 100, when the driver or passenger desires to operate the smartphone holding device. Notably, the smartphone holding device is also capable of holding devices other than a smartphone, such as other mobile computing devices including, but not limited to, cell phones, tablets, PDAs, and the like.

The holder 120 includes an upper grip member 122 for supporting an upper end of a smartphone, and a lower support member 126 for supporting a lower end of the smartphone. In accordance with this structure, the holder 120 is widened as the upper grip member 122 moves upwards away from the lower support member 126, or is narrowed as the upper grip member 122 moves downwards toward the lower support member 126. A tension spring 130 is installed between the upper grip member 122 and a vertical feeding member 140, to be tensioned or to be released from a tensioned state. The tension spring 130 applies tensile force to the upper grip member 122 when the upper grip member 122 moves upwards with respect to the lower support member 126.

The lower support member 126 is formed, at a desired portion thereof, with an extension stopper 126a having a protrusion shape. When the lower support member 126 is extended outwards from the main body 100, the extension stopper 126a limits upward movement of the lower support member 126 to a predetermined vertical distance allowing the smartphone to be held by the holder 120 while preventing the lower support member 126 from being separated from the main body 100.

The vertical feeding member 140 is arranged between the actuator 160 and the holder 120, to vertically move the holder 120, using drive force from the actuator 160. That is, the vertical feeding member 140 is vertically moved by drive force from the actuator 160, thereby vertically moving the holder 120.

The upper grip member 122 and lower support member 126 are separably connected while being partially overlapped with each other. The vertical feeding member 140 is interposed between the upper grip member 122 and the lower support member 126.

In more detail, the vertical feeding member 140 is connected between the upper grip member 122 and the lower support member 126, to vertically move the upper grip member 122 and lower support member 126 during vertical movement thereof by drive force from the actuator 160. The vertical feeding member 140 is formed with an upper engagement portion 142 protruding from a back surface of the vertical feeding member 140, for connection thereof with the upper grip member 122. The vertical feeding member 140 is also formed with a lower engagement portion 144 protruding from a front surface of the vertical feeding member 140, for connection thereof with the lower support member 126.

For mechanical connection of the holder 120 to the vertical feeding member 140, an opening 124 is formed at a lower end of the upper grip member 122, and a back engagement portion 129 protrudes from a back surface of an extension support member 128 formed at a lower portion of the lower support member 126.

The extension support member 128 extends downwards from a central portion of a lower surface of the lower support member 126 while having a plate shape. The back engagement portion 129 protrudes backwards from the back surface of the extension support member 128.

The upper engagement portion 142 is inserted into the opening 124 of the upper grip member 122, to be vertically movable. When the vertical feeding member 140 moves upwards, the upper engagement portion 142 is engaged with an upper end of the opening 124 and, as such, moves the upper grip member 122 in an upward direction. On the other hand, when the vertical feeding member 140 moves downwards, the upper engagement portion 142 is engaged with a lower end of the opening 124 and, as such, moves the upper grip member 122 in a downward direction.

The lower engagement portion 144 is vertically movably interposed between the lower surface of the lower support member 126 and the back engagement portion 129 of the extension support member 128. Accordingly, when the vertical feeding member 140 moves upwards, the lower engagement portion 144 is engaged with the lower surface of the lower support member 126 and, as such, moves the lower support member 126 in an upward direction. On the other hand, when the vertical feeding member 140 moves downwards, the lower engagement portion 144 is engaged with the back engagement portion 129 of the extension support member 128 and, as such, moves the lower support member 126 in a downward direction.

Through the above-described mechanical connection, the vertical feeding member 140 enables vertical movement and position locking of the upper grip member 122 and lower support member 126.

In addition, guide ribs 146 protrude forwards from a front surface of the vertical feeding member 140 at lateral edges of the vertical feeding member 140, to operate a holder support 150.

Figure 4:
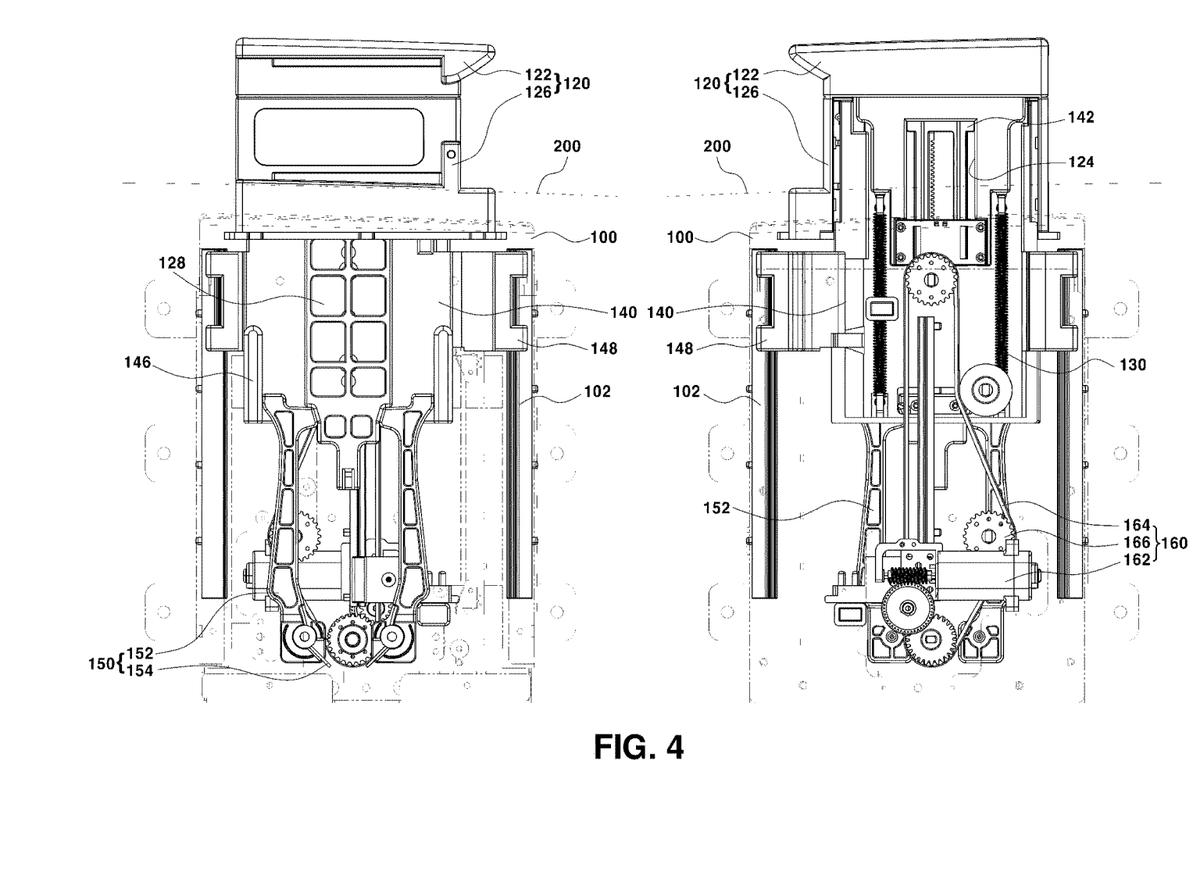
FIG. 4 illustrates a holder-extended state of the smartphone holding device according to embodiments of the present disclosure, through a front view and a rear view.

As illustrated in FIGS. 3 and 4, the holder support 150 includes a pair of holder support members 152. The holder support members 152 are pivotally installed in an inner space of the main body 100 while being elastically supported by torsion springs 154, respectively. When the vertical feeding member 140 is in a state of retracting into the main body 100, the holder support members 152 are arranged in front of the vertical feeding member 140 while being in a state of being laterally widened from each other by the torsion springs 154. When the vertical feeding member 140 moves upwards, the holder support members 152 are forced to pivot by the guide ribs 146 and, as such, are laterally narrowed toward each other, to converge toward a center therebetween. In this state, accordingly, the holder support members 152 support the lower surface of the lower support member 126 of the holder 120 and, as such, the position of the lower support member 126 is locked.

In more detail, when the vertical feeding member 140 moves upwards, the holder support members 152 are moved toward the extension support member 128 of the lower support member 126 by the guide ribs 146 and, as such, support a lower end of the extension support member 128. As a result, the holder support members 152 support the lower support member 126 such that the lower support member 126 is held at a predetermined raised position.

In a state in which the holder 120 retracts into the main body 100, the holder support members 152 are forced to be widened away from each other by the torsion springs 154. In this state, accordingly, the holder support members 152 are positioned without interfering with the extension support member 128.

The torsion springs 154 are coupled to pivot pins of the holder support members 152, respectively, to elastically support the holder support members 152 such that the holder support members 152 are maintained in a laterally widened state. When the holder support members 152 are forced to pivot by the guide ribs 146 such that the holder support members 152 are laterally narrowed toward each other, to converge toward a center therebetween, the torsion springs 154 are compressed and, as such, generate elastic return force.

The actuator 160 uses a configuration in which drive power from a motor 162 is transmitted to the vertical feeding member 140 by a drive belt 164 and pulleys 166. That is, the actuator 160 includes the motor 162, which is installed in the inner space of the main body 100, and the drive belt 164, which receives rotating force from the motor 162, thereby vertically moving the vertical feeding member 140.

In more detail, the motor 162, which generates drive power for vertical movement of the vertical feeding member 140, is installed behind the vertical feeding member 140 in the inner space of the main body 100. A plurality of pulleys 166, which receives the rotating force from the motor 162, to rotate, is rotatably mounted to a mounting panel 168. The drive belt 164 is connected to the vertical feeding member 140 by a vertical reciprocation block 165 after being wound around the pulleys 166.

In accordance with this configuration, rotation of the motor 162 is converted into linear movement which is, in turn, transmitted to the vertical feeding member 140. That is, as the drive belt 164 is rotated by the pulleys 166 in a normal or reverse direction, the vertical feeding member 140 is vertically moved.

Slide rails 102 are installed at lateral sides of the main body 100, respectively, to guide vertical movement of the vertical feeding member 140. Side blocks 148 are attached to lateral sides of the vertical feeding member 140, respectively. The side blocks 148 are vertically movable along respective slide rails 102.

Figure 9:
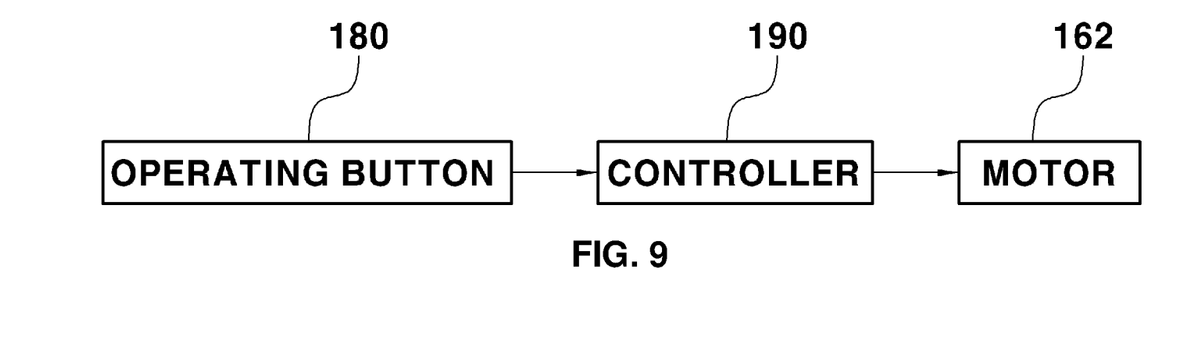
FIG. 9 is a view illustrating a configuration for operating an actuator of the smartphone holding device according to embodiments of the present disclosure.

Meanwhile, as illustrated in FIG. 9, the motor 162 of the actuator 160 operates based on a signal (alternatively referred to herein as an "operation signal") generated from an operating button 180 when the driver or passenger operates the operating button 180. Operation of the motor is controlled by a controller 190 installed in the vehicle based on the signal, i.e., "operation signal," from the operating button 180.

When the signal is generated from the operating button 180 under the condition that the holder 120 has been retracted into the inner space of the main body 100, the actuator 160 operates to extend the holder 120 outwards from the main body 100. On the other hand, when the signal is generated from the operating button 180 under the condition that the holder 120 has been extended outwards from the main body 100, the actuator 160 operates to retract the holder 120 into the main body 100.

The operating button 180 is arranged at the front side in the vehicle, to be easily operated by the driver and passenger. For example, the operating button 180 may be provided at a control panel board arranged between a driver seat and a front passenger seat.

Figure 7:
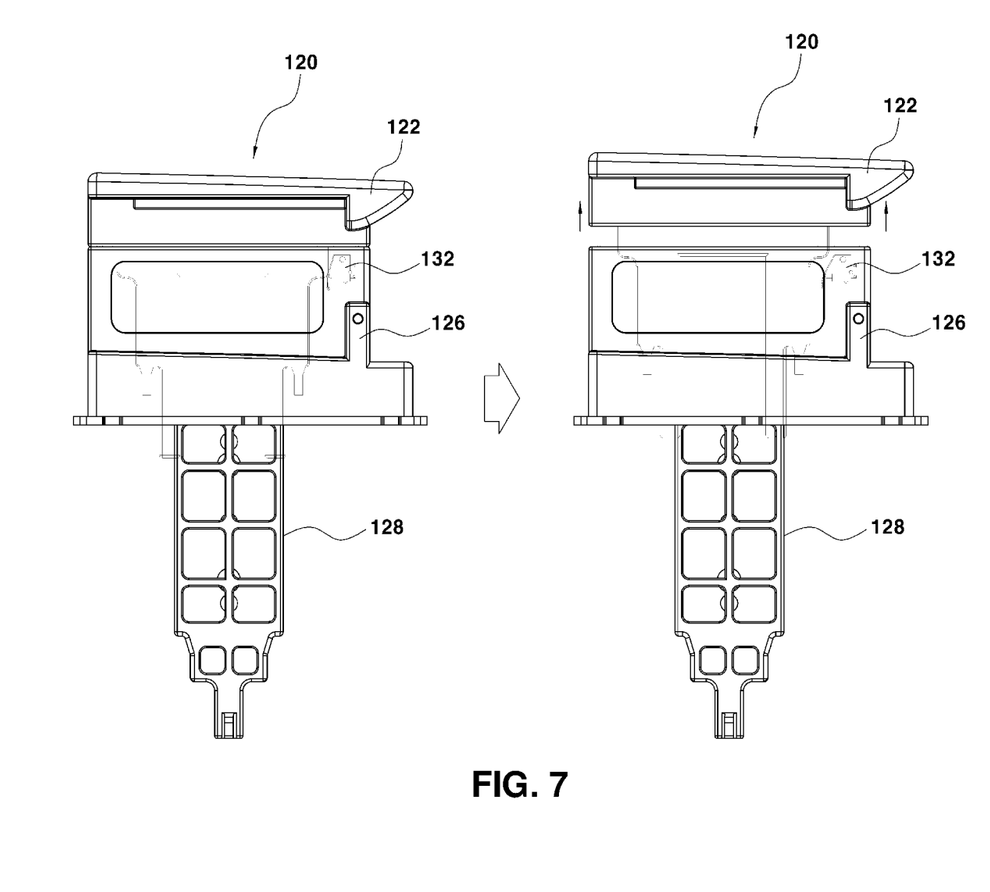
FIG. 7 is a view illustrating operation of a detection switch mounted to the smartphone holding device according to embodiments of the present disclosure.

In addition, as illustrated in FIG. 7, a mechanical (or contact) detection switch 132 is provided at the holder 120, to detect whether or not a smartphone is held in the holder 120. When a smartphone is held in the holder 120, the detection switch 132 operates and, as such, sends a detection signal to the controller 190.

In more detail, the detection switch 132 is mounted at an inside of the lower support member 126 such that the detection switch 132 operates when the upper grip member 122 is moved upwards away from the lower support member 126.

In detail, in a normal state, the detection switch 132 is pressed downwards by the upper grip member 122 and, as such, generates an ON signal. When the upper grip member 122 is moved upwards away from the lower support member 126, for holding of a smartphone, an OFF signal is generated. Accordingly, the controller 190 may determine whether or not holding of a smartphone occurs. Thus, the controller 190 determines, based on a signal from the detection switch 132, whether or not a smartphone has been held in the holder 120.

Figure 10:
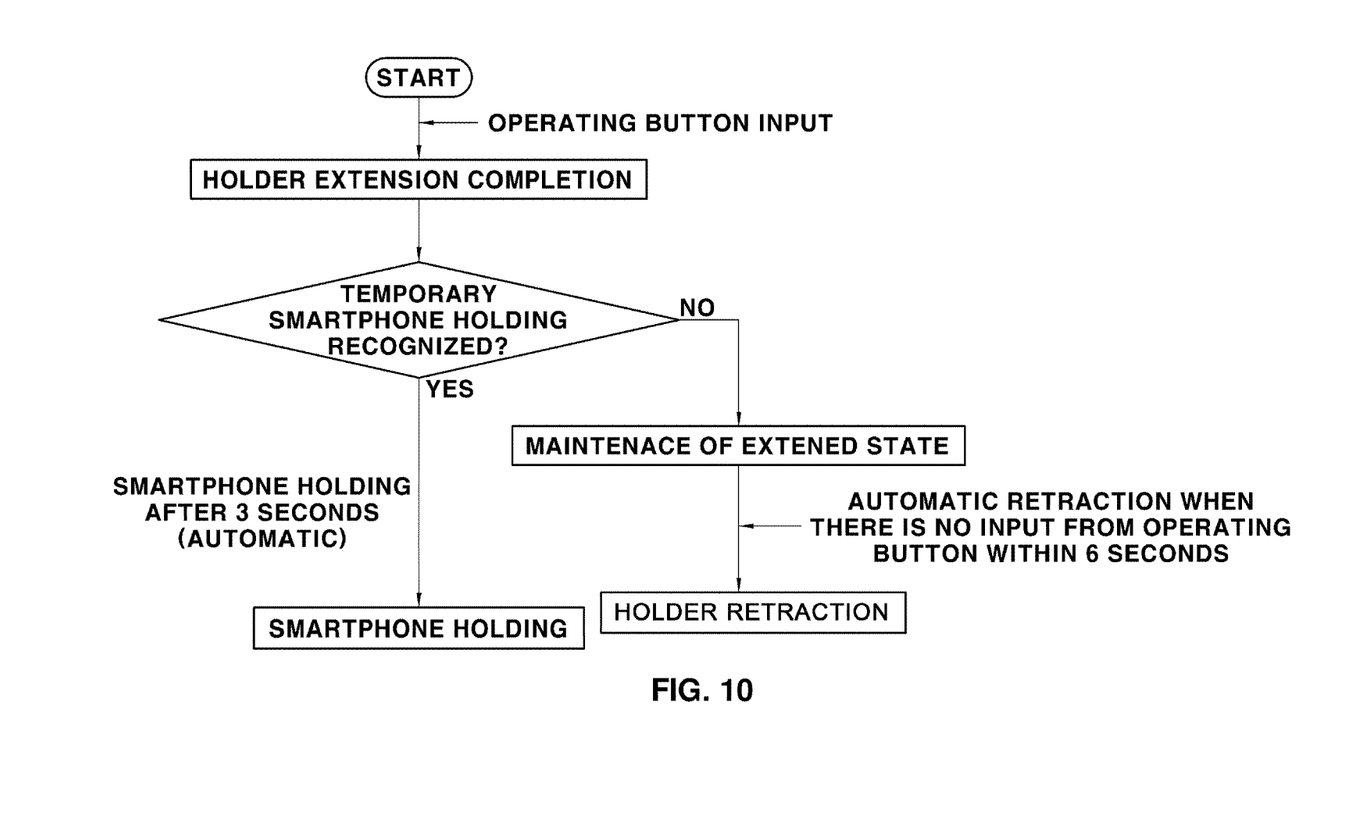
FIG. 10 is a flowchart briefly illustrating smartphone holding and locking (movement prevention) procedures of the smartphone holding device according to embodiments of the present disclosure.

This will be described in more detail with reference to FIG. 10. Upon receiving a signal from the operating button 180 under the condition that the holder 120 has been retracted into the main body 100, the controller 190 operates the actuator 160, to extend the holder 120 outwards from the main body 100. Thereafter, the controller 190 determines whether or not a smartphone has been held in the holder 120, based on a signal from the detection switch 132. Upon determining that a smartphone has been held in the holder 120, the controller 190 operates the actuator 160 after a predetermined time (e.g., three seconds), to move the vertical feeding member 140 downwards, and, as such, upward movement of the upper grip member 122 is prevented.

In this case, the vertical feeding member 140 moves downwards until the upper engagement portion 142 provided at the back surface of the vertical feeding member 140 comes into contact with the lower end of the opening 124 of the upper grip member 122 and, as such, prevents upward movement of the upper grip member 122.

In this state, even when external force is applied to the upper grip member 122, to cause upward movement of the upper grip member 122 while tensioning the tension spring 130, upward movement of the upper grip member 122 is impossible because the upper grip member 122 is engaged with the upper engagement portion 142 of the vertical feeding member 140. As the tension spring 130 connected between the upper grip member 122 and the vertical feeding member 140 is further tensioned in this case, elastic return force to pull the upper grip member 122 downwards is increased. As a result, unintentional widening of the holder 120 is securely prevented.

Since widening of the holder 120 is prevented under the condition that a smartphone has been held in the holder 120, in accordance with prevention of upward movement of the upper grip member 122, it may be possible to secure stability while preventing movement of the smartphone during travel of the vehicle.

In more detail, when a smartphone is held in the holder 120, the upper grip member 122 is pulled toward the lower support member 126 by tensile force of the tension spring 130 installed between the upper grip member 122 and the vertical feeding member 140, thereby elastically supporting the smartphone. Subsequently, the vertical feeding member 140 moves downwards, thereby preventing widening of the holder 120. At the same time, grip force to hold the smartphone is increased and, as such, movement of the smartphone is prevented during travel of the vehicle.

Meanwhile, when the controller 190 determines that a smartphone is not held in the holder 120, after operating the actuator 160 to extend the holder 120 outwards from the main body 100, and does not receive a signal from the operating button 180 within a predetermined time (e.g., six seconds), the controller 190 operates the actuator 160, to cause the holder 120 to be automatically retracted into the inner space of the main body 100.

Figure 11:
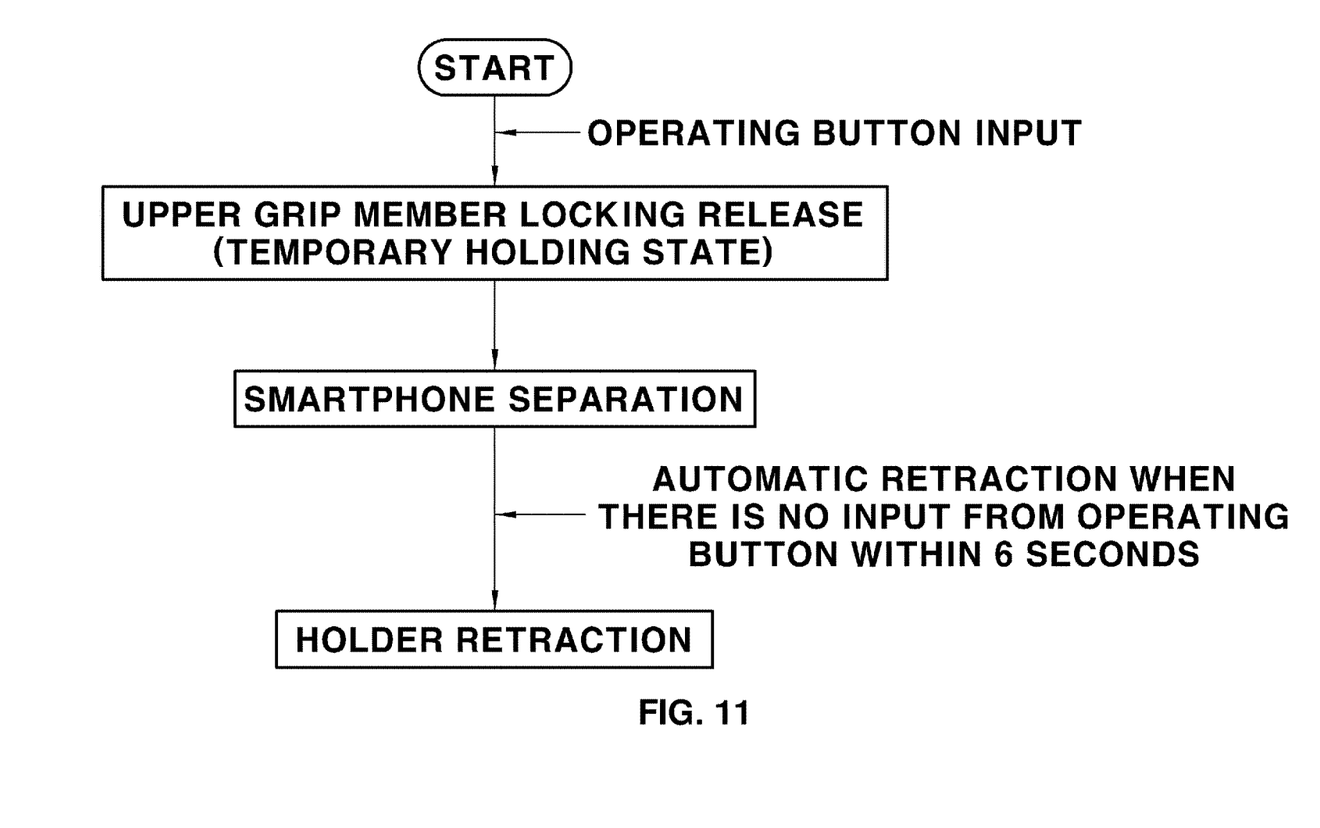
FIG. 11 is a flowchart briefly illustrating smartphone separation and holder retraction procedures of the smartphone holding device according to embodiments of the present disclosure.

In addition, as illustrated in FIG. 11, upon receiving a signal from the operating button 180 under the condition that a smartphone has been held in the holder 120 while being prevented from moving, the controller 190 operates the actuator 160, to release widening prevention/locking of the holder 120.

In accordance with operation of the actuator 160 as described above, the upper feeding member 140 is moved upwards by a predetermined distance, to allow upward movement of the upper grip member 122 and widening of the holder 120. Then, the controller 190 determines whether or not the smartphone has been separated from the holder 120, based on a signal from the detection switch 132.

Upon determining that the smartphone has been separated from the holder 120, and there is no signal from the operating button 180 input to the controller 190 within a predetermined time (e.g., six seconds) after the determination, the controller 190 operates the actuator 160, to cause the holder 120 to be automatically retracted into the inner space of the main body 100.

In the smartphone holding device of the present disclosure having the above-described configuration, the main body 100 is fixedly installed inside of the crash pad 200 arranged in front of the driver seat in the vehicle, and the top surface of the holder 120 received in the inner space of the main body 100, in detail, the top surface of the upper grip member 122, has a top surface flush with the surface of the crash pad 200 without forming a step. In accordance with this configuration, when the holder 120 is retracted into the main body 100, the holder 120 is disposed inside the crash pad 200. On the other hand, when the holder 120 is extended outwards from the main body 100, the holder 120 protrudes from the upper surface of the crash pad 200 (e.g., see FIGS. 3 and 4).

Hereinafter, operation of the smartphone holding device having the above-described configuration will be described with reference to the accompanying drawings.

In a state in which the holder 120 is retracted into the main body 100, as illustrated in FIG. 3, the top surface of the upper grip member 122 is flush with the surface of the crash pad 200 without forming a step.

In this state, the vertical feeding member 140 is positioned at a lower portion of the main body 100, to maintain the upper grip member 122 and lower support member 126 within the main body 110.

Furthermore, in this state, the upper engagement portion 142 and lower engagement portion 144 of the vertical feeding member 140 are engaged with the lower end of the opening 124 of the upper grip member 122 and the back engagement portion 129 of the extension support member 128, respectively, to prevent upward movement of the holder 120.

When a signal, i.e., "operation signal," from the operating button 180 is subsequently input to the controller 190 by the user's pushing of the operating button 180, the controller 190 operates the actuator 160 and, as such, the vertical feeding member 140 is moved upwards in accordance with operation of the actuator 160. In accordance with upward movement of the vertical feeding member 140, the holder 120 is moved upwards together with the vertical feeding member 140, as illustrated in FIG. 4.

In this case, the holder 120 moves together with the vertical feeding member 140 after the upper engagement portion 142 and lower engagement portion 144 of the vertical feeding member 140 are engaged with the upper end of the opening 124 of the upper grip member 122 and the lower surface of the lower support member 126, respectively, As the vertical feeding member 140 moves upwards, the holder support members 152 are forced to pivot by the guide ribs 146 and, as such, are laterally narrowed toward each other, to converge toward a center therebetween. Accordingly, the holder support members 152 support the lower surface of the lower support member 126 of the holder 120 by supporting the lower end of the extension support member 128 and, as such, the position of the lower support member 126 is locked.

The torsion springs 154 to elastically support respective holder support members 152 are compressed in accordance with the above-described movement of the holder support members 152 and, as such, generate elastic return force. When the vertical feeding member 140 subsequently performs downward movement, the holder support members 152 return to original positions thereof by the elastic return force of the torsion springs 154.

Figure 5:
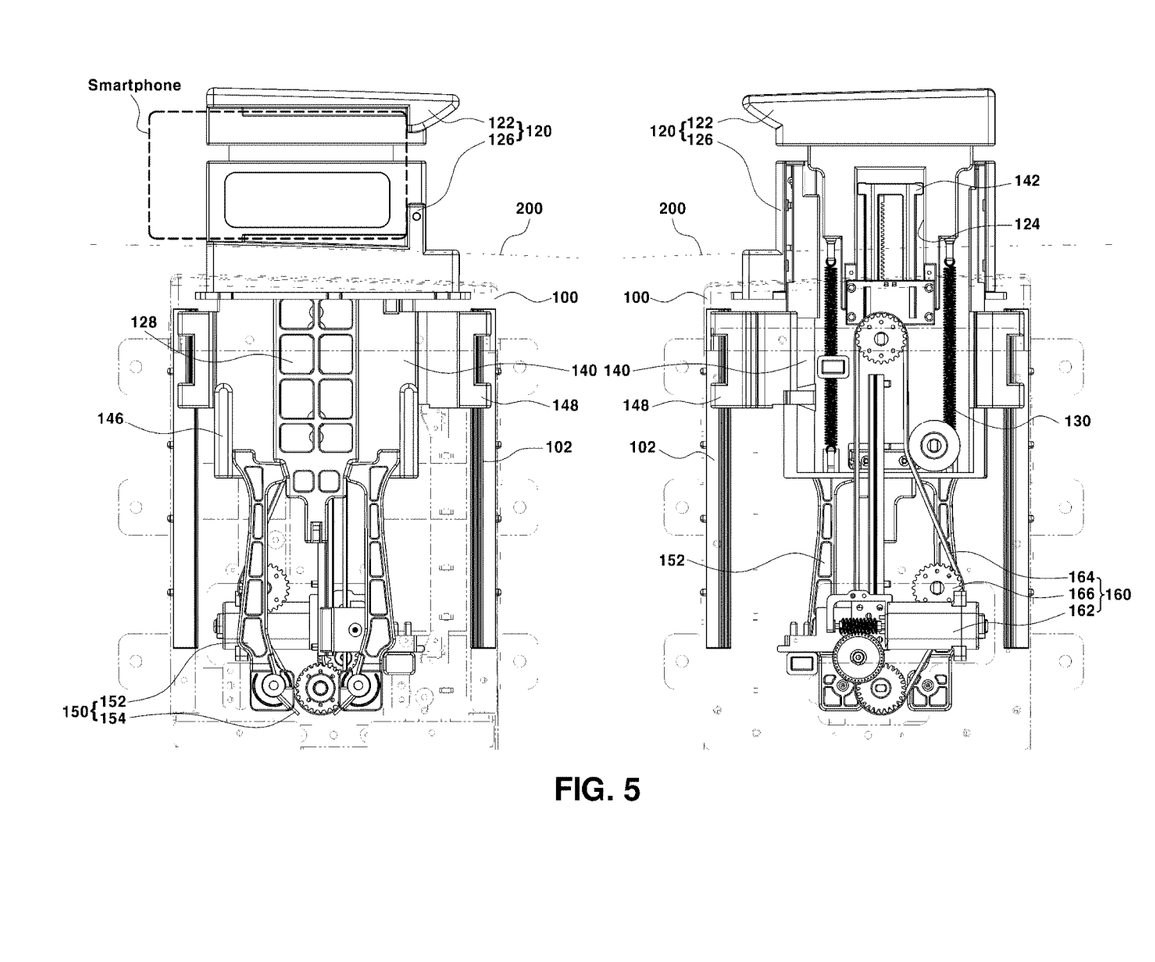
FIG. 5 illustrates a state in which a smartphone is held in a holder of the smartphone holding device according to embodiments of the present disclosure, through a front view and a rear view.
Figure 6:
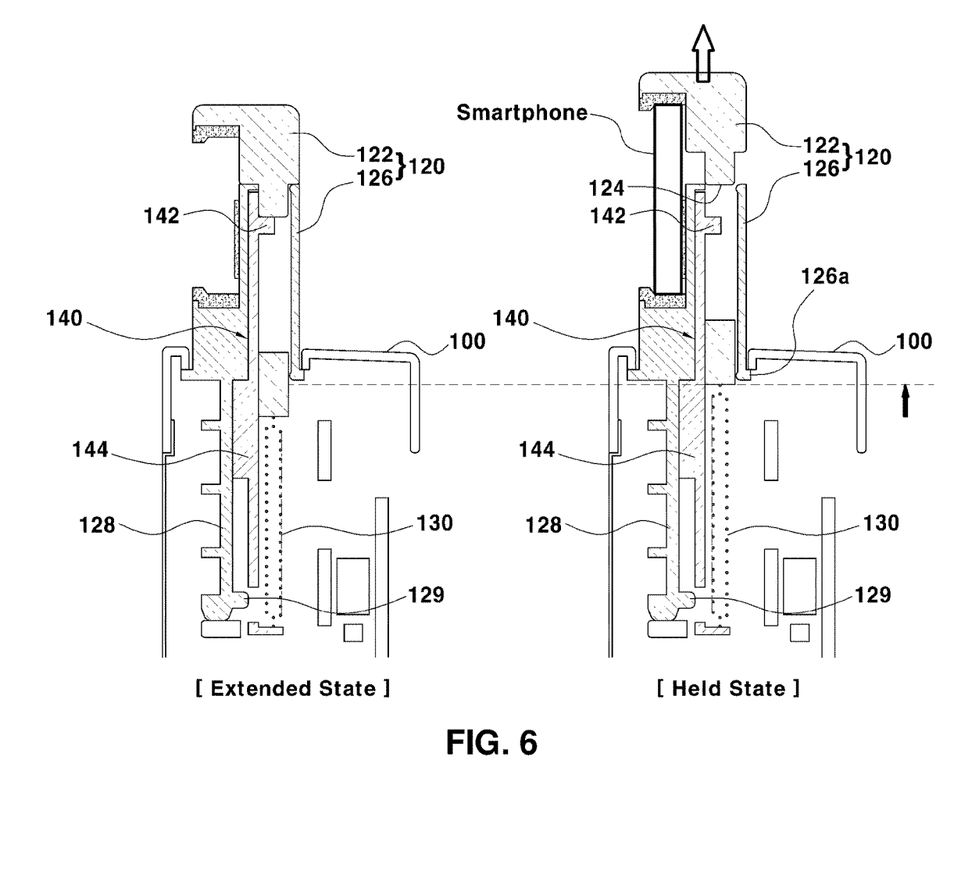
FIG. 6 is a sectional view illustrating a holder-extended state and a state in which a smartphone is held in the holder of the smartphone holding device according to embodiments of the present disclosure.

Thereafter, as illustrated in FIGS. 5 and 6, the user lifts the upper grip member 122, to widen the holder 120, and inserts a smartphone into the holder 120, to cause the smartphone to be held in the holder 120. In this case, the tension spring 130 installed between the upper grip member 122 and the vertical feeding member 140 applies tensile force to the upper grip member 122 while being tensioned. Accordingly, the holder 120 elastically holds the smartphone by tensile force applied to the upper grip member 122.

Figure 8:
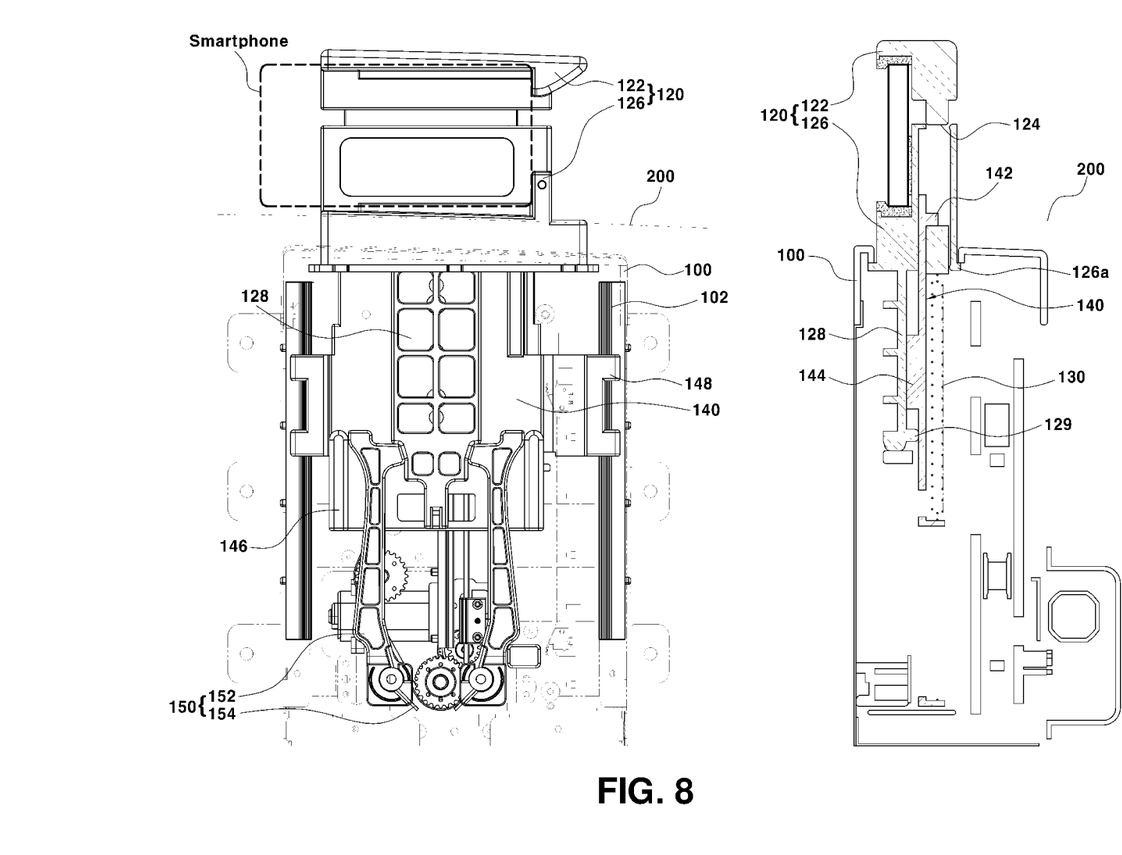
FIG. 8 illustrates a holder-locked (widening-prevented) of the smartphone holding device according to embodiments of the present disclosure, through a front view and a sectional view.

Subsequently, as illustrated in FIG. 8, the vertical feeding member 140 is moved downwards by a predetermined distance, to prevent the smartphone from moving or swaying in the holder 120.

In this case, the vertical feeding member 140 moves downwards until the upper engagement portion 142 provided at the back surface of the vertical feeding member 140 and the lower engagement portion 144 provided at the front surface of the vertical feeding member 140 are engaged with the lower end of the opening 124 of the upper grip member 122 and the back engagement portion 129 of the extension support member 128. In this state, even when external force is applied to the upper grip member 122, to cause upward movement of the upper grip member 122 while tensioning the tension spring 130, upward movement of the upper grip member 122 is impossible because the upper grip member 122 is engaged with the upper engagement portion 142. As a result, upward movement of the upper grip member 122 and widening of the holder 120 are prevented and, as such, the smartphone may be stably held. Thus, it may be possible to prevent movement of the smartphone during travel (i.e., driving) of the vehicle.

In this case, the tension spring 130 is further tensioned in accordance with downward movement of the vertical feeding member 140 and, as such, tensile force of the tension spring 130 to pull the upper grip member 122 downwards is increased.

When the user subsequently desires to separate the smartphone from the holder 120, the user presses the operating button 180, as illustrated in FIG. 11, to input a signal from the operating button 180 to the controller 190.

In response to the input signal, the controller 190 operates the actuator 160, to move the vertical feeding member 140 upwards by a predetermined distance. In this state, the user can lift the upper grip member 122, to widen the holder 120.

When the user separates the smartphone from the holder 120 after widening the holder 120, the controller 190 recognizes separation of the smartphone, based on an ON signal from the detection switch 132. When there is no signal input from the operating button 180 within a predetermined time, the controller 190 again operates the actuator 160, to retract the holder 120 into the main body 100.

Meanwhile, the controller 190 sets and stores a drive voltage level at which the actuator 160 vertically moves the vertical feeding member 140 by a predetermined distance upon preventing upward movement of the upper grip member 122 and widening of the holder 120 or releasing prevention of widening of the holder 120.

As apparent from the above description, in accordance with embodiments of the present disclosure, when the user simply presses the operating button (provided in front of the driver's seat in the vehicle, for example), the holder for holding a smartphone is automatically extended from inside of the crash pad. By virtue of the locking structure for preventing movement of a smartphone held in the holder, it may be possible to prevent movement of the smartphone during travel of the vehicle. Accordingly, there are advantages in that enhanced convenience and stability of the smartphone holding device are provided during travel of the vehicle.

In addition, the smartphone holding device according to the present disclosure is normally in a state of being retracted into the crash pad, and is extendable from the inside of the crash pad in accordance with a user's desire. Accordingly, there is an advantage in that separate keeping of the smartphone holding device is unnecessary.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. A smartphone holding device of a vehicle, the smartphone holding device comprising:
   a holder having an upper grip member and a lower support member for holding a smartphone;
   a main body configured to receive the holder such that the holder is extendable from the main body;
   an actuator configured to generate a drive force causing vertical movement of the holder;
   a vertical feeding member installed between the upper grip member and the lower support member and configured to vertically move the holder by the drive force from the actuator; and
   a tension spring installed between the upper grip member and the vertical feeding member to apply a tensile force to the upper grip member,
   wherein the upper grip member and the lower support member are separably connected while being partially overlapped with each other, and
   wherein the smartphone holding device further includes:
      a controller controlling operation of the actuator based on an operation signal generated when a user operates an operating button; and
      a mechanical detection switch installed at the holder to detect whether or not the smartphone is held in the holder.

2. The smartphone holding device of claim 1, wherein: the vertical feeding member is interposed between the upper grip member and the lower support member.

3. The smartphone holding device of claim 2, wherein: an extension support member is formed at a central portion of a lower surface of the lower support member to protrude downwards from the lower surface of the lower support member;
   a back engagement portion is formed at a back surface of the extension support member to protrude backwards from the back surface of the extension support member;
   a lower engagement portion having a protrusion shape is formed at a front surface of the vertical feeding member to be vertically movable between the lower surface of the lower support member and the back engagement portion of the extension support member; and
   an upper engagement portion having a protrusion shape is formed at a back surface of the vertical feeding member to be vertically movably inserted into an opening formed at a lower end of the upper grip member.

4. The smartphone holding device of claim 2, wherein:
   a pair of holder support members, which are elastically supported to be laterally widened from each other by torsion springs, are installed at a lower portion of the main body;
   guide ribs are formed at lateral edges of the vertical feeding member, respectively, to protrude forwards; and
   the pair of holder support members are pivoted by the guide ribs during upward movement of the vertical feeding member to converge toward a center therebetween, thereby supporting a lower surface of the lower support member.

5. The smartphone holding device of claim 1, wherein:
   the controller determines whether or not the smartphone is held in the holder based on a signal received from the detection switch, upon receiving the operation signal from the operating button in a state in which the holder is retracted into the main body; and
   the controller operates the actuator upon determining that the smartphone is held in the holder so as to move the vertical feeding member downwards until the upper engagement portion is engaged with a lower end of the opening of the upper grip member, to prevent upward movement of the upper grip member.

6. The smartphone holding device of claim 5, wherein, upon determining that the smartphone is not held in the holder, and the operation signal is not received from the operating button within a predetermined time after the determination, the controller operates the actuator so as to cause the holder to be retracted into the main body.

7. The smartphone holding device of claim 5, wherein:
   upon receiving the operation signal from the operating button when the smartphone is held in the holder, the controller operates the actuator so as to release prevention of upward movement of the upper grip member and then determines whether or not the smartphone is separated from the holder based on the signal received from the detection switch; and
   when it is determined that the smartphone is separated from the holder, and the operation signal is not received from the operating button within a predetermined time after the determination, the controller operates the actuator so as to cause the holder to be retracted into the main body.

8. The smartphone holding device of claim 1, wherein slide rails are installed at lateral sides of the main body, respectively, to guide vertical movement of the vertical feeding member.

9. The smartphone holding device of claim 1, wherein:
   the main body is fixedly installed inside of a crash pad arranged in the vehicle; and
   a top surface of the holder retracted into an inner space of the main body is flush with a surface of the crash pad without forming a step.

* * * * *